(12) United States Patent
Fagerkvist (10) Patent No.: US 10,082,726 B2
(45) Date of Patent: Sep. 25, 2018

(54) BALL JOINT

(71) Applicant: Axis AB, Lund (SE)

(72) Inventor: David Fagerkvist, Bunkeflostrand (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/457,551

(22) Filed: Mar. 13, 2017

(65) Prior Publication Data

US 2017/0269460 A1   Sep. 21, 2017

(30) Foreign Application Priority Data

Mar. 20, 2016   (EP) .................................. 16160342

(51) Int. Cl.
| | | |
|---|---|---|
| G03B 17/56 | (2006.01) | |
| F16C 11/06 | (2006.01) | |
| F16M 13/02 | (2006.01) | |
| F16M 11/14 | (2006.01) | |
| F21V 21/29 | (2006.01) | |

(52) U.S. Cl.
CPC ............ G03B 17/561 (2013.01); F16C 11/06 (2013.01); F16M 11/14 (2013.01); F16M 13/02 (2013.01); F21V 21/29 (2013.01)

(58) Field of Classification Search
CPC ........ F16C 11/06; G03B 17/561; F16M 13/02
See application file for complete search history.

(56) References Cited

U.S. PATENT DOCUMENTS

| | | | |
|---|---|---|---|
| 2,910,310 A | | 10/1959 | Mulac |
| 3,034,809 A | * | 5/1962 | Greenberg ............... F21V 21/29 |
| | | | 285/267 |
| 3,186,736 A | | 6/1965 | Warshawsky |
| 3,312,482 A | | 4/1967 | Barrett et al. |
| 4,225,260 A | * | 9/1980 | Gaines ..................... B62D 7/18 |
| | | | 285/264 |
| 4,322,098 A | | 3/1982 | Warshawsky |
| 4,515,336 A | * | 5/1985 | Fischer ............... F16C 11/0619 |
| | | | 248/288.51 |
| 4,842,308 A | | 6/1989 | Spotts |
| 5,569,089 A | * | 10/1996 | Signorelli ................ F16D 3/30 |
| | | | 464/112 |

(Continued)

FOREIGN PATENT DOCUMENTS

| | | |
|---|---|---|
| DE | 2538668 A1 | 5/1976 |
| DE | 10338498 A1 | 3/2005 |

OTHER PUBLICATIONS

EP 16 16 0342.8 European Search Report (dated Sep. 22, 2016).

Primary Examiner — Clayton E Laballe
Assistant Examiner — Linda B Smith
(74) Attorney, Agent, or Firm — Volpe and Koenig, P.C.

(57) ABSTRACT

A ball joint arranged to couple an attachment part to a base part is provided. The ball joint comprises: a ball associated with said attachment part and provided with a groove having ends; a ball socket formed in the base part and provided with a recess; and a coupling element. The recess and the groove are arranged such that a respective part of a coupling element is allowed to move therein. The combined arrangement of the recess, the groove, and the coupling element allows the ball to move from a first end position to a second end position by a rotational movement of at least 360 degrees. The recess is larger than the part of the coupling element located therein.

12 Claims, 7 Drawing Sheets

(56) References Cited

U.S. PATENT DOCUMENTS

| | | | |
|---|---|---|---|
| 8,267,361 B1 * | 9/2012 | Dordick | F16M 11/14 248/178.1 |
| 2004/0195469 A1 | 10/2004 | Kondo | |
| 2008/0210832 A1 * | 9/2008 | Speggiorin | F16M 11/14 248/183.1 |
| 2011/0223802 A1 | 9/2011 | Zeller et al. | |

* cited by examiner

BALL JOINT

FIELD OF INVENTION

The disclosure relates to a ball joint arranged to couple an attachment part to a base part and further relates to a system comprising such a ball joint. The disclosure specifically relates to a ball joint for coupling an attachment part that is tiltable relative the base part and that is further rotatable about a longitudinal axis thereof.

BACKGROUND

Ball joints are utilized in many different applications, for example in holder arrangement for devices to be placed or mounted on a horizontal or vertical surface. The holder arrangement may comprise an attachment part and a base part that are connected through a ball joint. The ball joint may allow the attachment part to be moved by for example a rotational and/or a tilt movement.

In applications when a cable or the like is arranged through a ball joint, it is desirable to provide a rotation stop that limits the rotational movement of the attachment part relative the base part. An unlimited rotational movement of the attachment part relative the base part may cause a problem in that the cable may be twisted beyond function, be sheared off, or a continuous rotation may dislodge connectors thereof.

One way of creating a rotation stop in a ball joint is to provide a groove around the waist of the ball of the ball joint. A pin that is positioned in the ball socket of the ball joint protrudes into the groove of the ball. The groove is formed with ends so as to provide end positions for the pin when moved along the groove during rotation of the ball. Thus, the rotational movement of the ball in the ball socket is limited by the end positions.

However, by this solution the rotational movement is limited to an angle less than 360 degrees. In other words, the ball cannot be rotated in the whole rotational span. This is an undesired limitation in applications having for example a monitoring camera as part of the attachment part. In such cases, a rotation of at least 360 degrees of the ball, and thereby the attachment part, is desired.

A solution to this problem is provided by document U.S. Pat. No. 3,312,482 that discloses a rotatable swivel assembly. The assembly comprises a rotation limiting arrangement for preventing excessive twisting of an electrical extending through the swivel. A swivel member is arranged in a cup member that, in turn, is arranged in a tubular housing. A first co-acting stop means is arranged on the swivel housing and the cup member. A second co-acting stop means is arranged on the cup member and the swivel member. The co-acting stop means limit the rotation of the swivel member relative to the swivel housing while still allowing a rotation of at least 360 degrees.

It may however be desirable to provide an improved ball joint in view of its design and functions.

SUMMARY

It is an object of the present disclosure to provide a ball joint with rotation stop that allows a rotational movement of at least 360 degrees. It is a further object of the present disclosure to provide a ball joint that allows rotational movement in combination with a tilt movement of a first part comprising the ball relative a second part comprising the ball socket of the ball joint. It is a specific object of the present disclosure to provide a ball joint in which the first part comprising the ball may be rotated and tilted simultaneously in relation to the second part comprising the ball socket, thus providing freedom when adjusting the first part relative the second part.

According to a first aspect, the above and further objects that will be evident from the following description are achieved by a ball joint arranged to couple an attachment part to a base part such that the attachment part is tiltable relative the base part and such that the attachment part is rotatable about a longitudinal axis thereof, the ball joint comprising: a ball associated with said attachment part and provided with a groove having ends; a ball socket formed in the base part and provided with a recess; and a coupling element; wherein the ball and the coupling element are arranged in the ball socket such that a part of the coupling element is located in the groove and another part of the coupling element is located in the recess whereby movement of the ball is restricted; wherein the recess and the groove are arranged such that the respective part of the coupling element is allowed to move therein; wherein the combined arrangement of the groove, the recess, and the coupling element allows the ball to move from a first end position to a second end position by a rotational movement of at least 360 degrees; and wherein the recess is larger than the part of the coupling element located therein such that the coupling element is allowed to move freely in the plane of the recess.

A ball joint having a rotation stop but is yet able to rotate more than 360 degrees is thus provided. This effect is provided by the combined arrangement of the recess, the groove, and the coupling element. It is noted that the recess, the groove, and the coupling element may be formed in a wide variety of ways in order to achieve that the combined arrangement provides a rotational movement of more than 360 degrees. Different combined arrangements of the recess, the groove, and the coupling element that are possible within the scope of the disclosure, besides the ones that will be exemplified in the detailed description below, are available for the skilled person.

Moreover, the inventive ball joint provides the advantage of allowing simultaneous rotational movement and tilt movement of the ball relative the ball socket. Specifically, the ball is allowed to rotate at least during tilting of the ball in a selected tilt range. The selected tilt range may be 0-90 degrees where 0 degrees defines a starting position of the ball. The ball (and thus an associated part comprising the ball) does thus not need to be tilted to a specific tilt angle in the selected tilt range for enabling rotation. The ball joint thus provides an improved range and freedom of adjusting the ball relative the ball socket.

This effect of simultaneous tilt and rotational movement is provided by that the recess is larger than the part of the coupling element located therein. The recess is arranged such that the coupling element is allowed to move freely in the plane of the recess. By move freely is meant that the coupling element may be moved within the recess, i.e. along the plane of the recess, without guidance in a particular direction. A contravening design would be a recess arranged as a groove in which the coupling element would, when moved, be guided in a specific direction.

A further advantage of the ball joint is its compact design which may provide a simple manufacturing process and which may provide a space efficient system when mounted.

The groove may be arranged essentially around the ball.

The groove may be arranged equatorially whereby a gap is provided between the groove ends. The recess may be arranged to allow the part of the coupling element located therein to move a distance corresponding to the gap.

The recess may be arranged such that the tilt axis of the ball extends through the recess.

In one embodiment, the groove is arranged helically. The groove may in addition be arranged essentially equatorially. In this embodiment, the groove may be arranged at least around the ball, i.e. more than one turn around the ball, thus allowing a rotational movement of the ball of more than 360 degrees. By the form of the recess, that is larger than the part of the coupling element located therein such that free movement of the coupling element is allowed, the coupling element may be allowed to move along the helically shaped groove without forcing the ball to tilt sideways. By tilt sideways is meant tilting in a direction traverse to the main tilt direction provided by the ball joint.

Preferably, the helically arranged groove extends slightly more than a turn around the ball, such as between 1 and 1% turn around the ball, thus allowing a rotational movement of the ball of slightly more than 360 degrees.

The recess according to any of the above embodiments may be circular. This design may be advantageous in a manufacturer's perspective. The circular recess may be arranged such that the tilt axis of the ball extends through the center of the recess.

In one embodiment, the attachment part is tiltable at least 90 degrees relative the base part. The attachment part may be intended to tilt 90 degrees and has therefore been designed with a maximum tilt angle of slightly more than 90 degrees for compensating for a margin of error during manufacturing.

The coupling element may be made of steel or any other equivalently force resistant material. If the ball is pushed to rotate beyond any of the end positions, the coupling element is exposed to that force. By manufacturing the coupling element in a force resistant material such as steel, the coupling element resistance is increased. The attachment part, and thus the associated ball socket, and the base part, including the associated ball, may be made of aluminum.

The attachment part may be part of a monitoring camera, an illumination device, or a speaker device. Within the scope of this application, the term monitoring camera includes thermal sensors as well.

According to a second aspect, the above and further objects that will be evident from the following description are achieved by a system comprising an attachment part and a base part which are coupled by a ball joint such that the attachment part is tiltable relative the base part and such that the attachment part is rotatable about a longitudinal axis thereof, wherein the ball joint is arranged according to any one of the above disclosed embodiments.

The system may further include a monitoring camera comprising the attachment part.

The above features and advantages disclosed in connection to the first aspect apply also to this second aspect. To avoid undue repletion, reference is made to the above.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise.

BRIEF DESCRIPTION OF THE DRAWINGS

A more detailed understanding may be had from the following description, given by way of example in conjunction with the accompanying drawings wherein.

DETAILED DESCRIPTION

A ball joint according to a first embodiment will now be disclosed with reference to FIGS. 1-6. FIGS. 1-6 show embodiments of the ball joint. The ball joint may be embodied in many different forms and should not be construed as limited to the embodiments set forth herein.

Figure 1A:
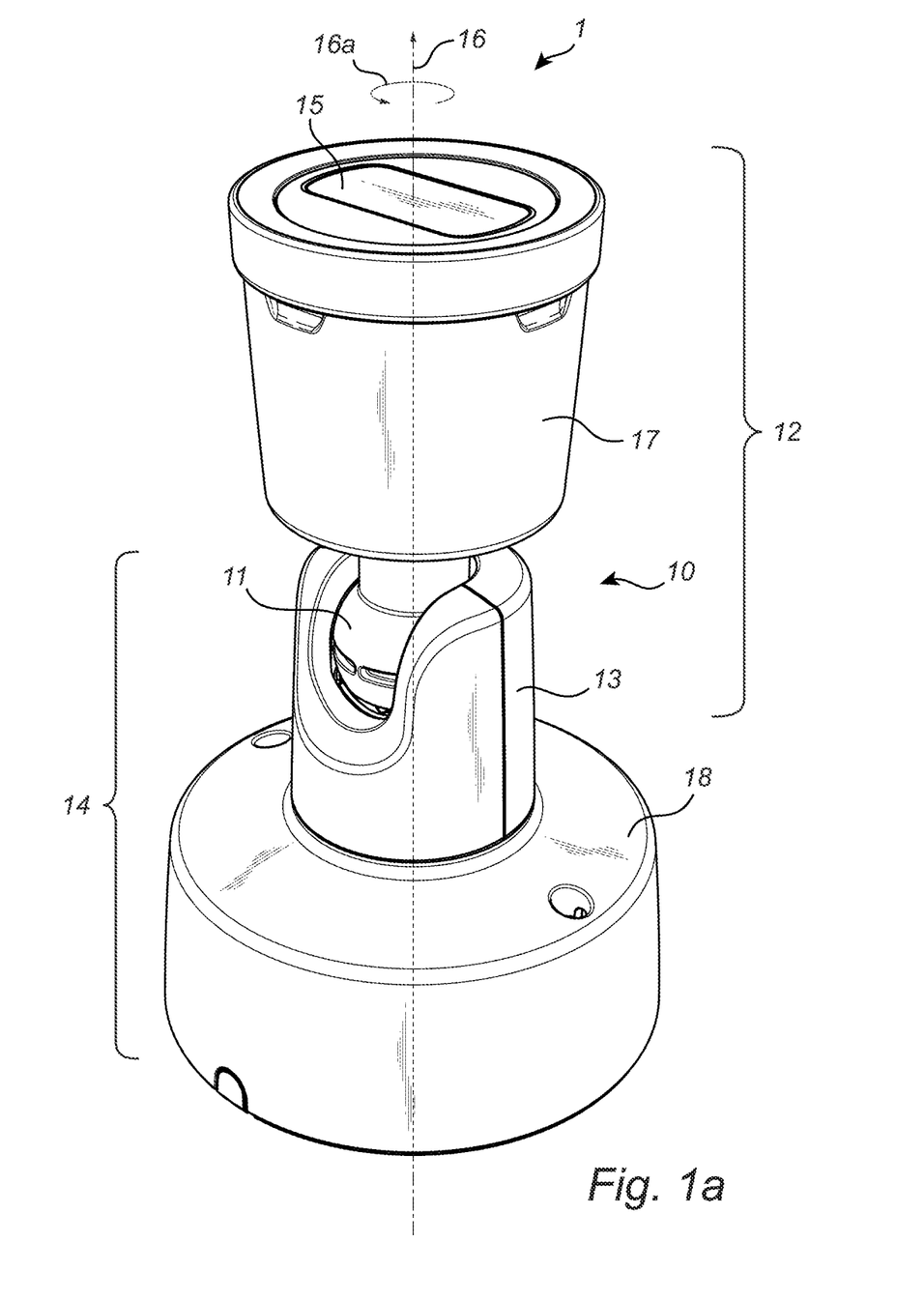
FIG. 1a illustrates a system comprising an attachment part and a base part being coupled by a ball joint according to one embodiment.

FIG. 1a discloses a system 1 comprising a first part in the form of an attachment part 12 and a second part in the form of a base part 14. The attachment part 12 and the base part 14 are coupled by a ball joint 10. The ball joint 10 comprises a ball 11 which is arranged in a ball socket 13. A general purpose of the construction of the ball joint 10 is to provide a rotational movement and a tilt movement of the ball 10, and thus the associated attachment part 12, relative the ball socket 13, and thus relative the base part 14 in which the ball socket 13 is formed. The attachment part 12 is allowed to rotate about a longitudinal axis 16 thereof, as indicated by 16a. Rotation in a direction reverse to the one indicated by 16a is also allowed.

The ball 11 forms part of the attachment part 12. The attachment part 12 further comprises a housing 17 in which a camera device (not shown) is arranged. The camera device may for example be a monitoring camera device, comprising a visual or a thermal image sensor for capturing visual or thermal images of a monitored scene. A window 15 is provided in the housing 17 for enabling a field of view outside the housing 17 to the camera device therein.

The ball socket 13 forms part of the base part 14. The base part 14 further comprises a mounting part 18. The mounting part 18 is arranged to be attached to a surface, for example a wall.

The system 1 is thus provided as a camera arrangement which is mountable by the base part 14 and wherein the attachment part 12, comprising the camera device, is rotatable around it longitudinal axis 16 thereof and tiltable relative the base part 14.

Figure 1B:
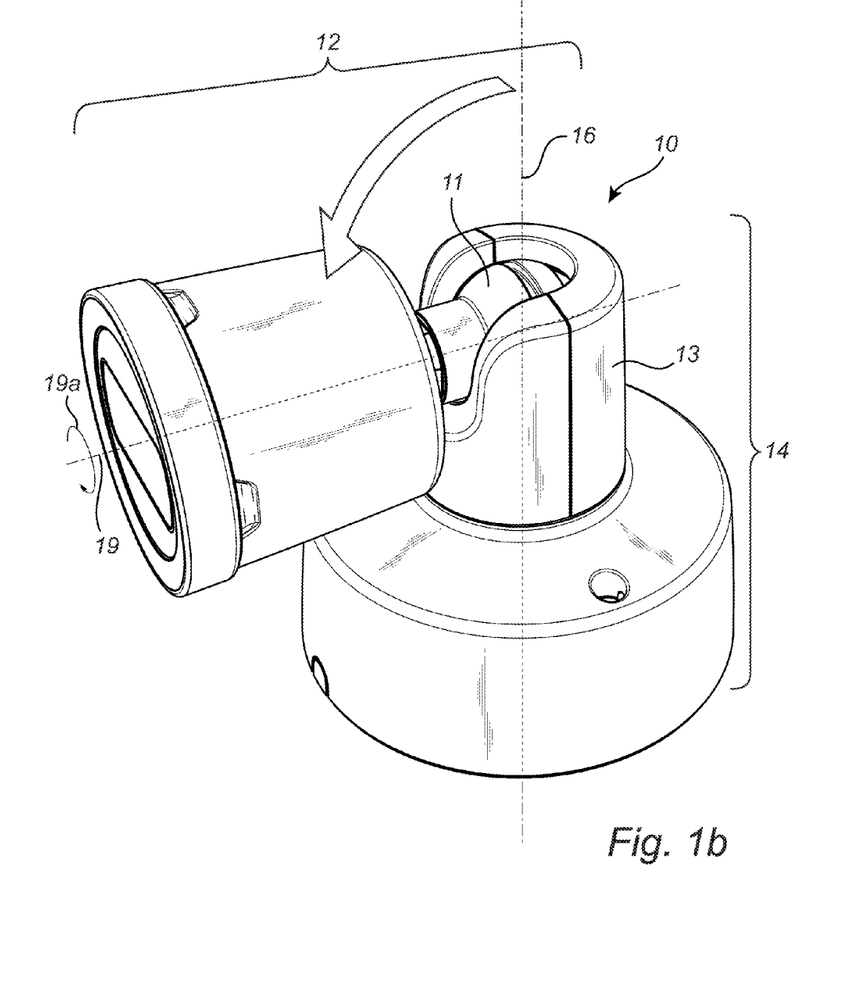
FIG. 1b illustrates the system of FIG. 1a where the attachment part has been tilted relative the base part.

In FIG. 1b, the attachment part 12 has been tilted to a tilt axis 90 degrees from the starting position (illustrated in FIG. 1a). Thus, the camera device's field of view may be adjusted. The attachment part 12 is rotatable about a longitudinal axis 19 thereof, as indicated by 19a. Rotation in a direction reverse to the one indicated by 19a is also allowed.

The system 1 is arranged so that the ball 11 may be fixed in the ball socket 13, meaning that any movement of the ball 11 is prevented. In this embodiment of the system 1, the ball 11 may be fixed in the ball socket 13 by wedging the ball 11 in the ball socket 13. This may be achieved by forcing a bottom part of the ball socket 13 upwards such that the ball 11 is forced against upper inner walls of the ball socket 13. Other conventional methods for fixing a ball in a ball socket may alternatively be applied.

It is noted that the general functions of allowing rotational movement and tilt movement of the attachment part 12 relative the base part 14 may be achieved by other ball joint designs as well. In other words, the constructional details of the ball joint 10, as is disclosed below, may be applied to ball joints having other designs as well.

Figure 2:
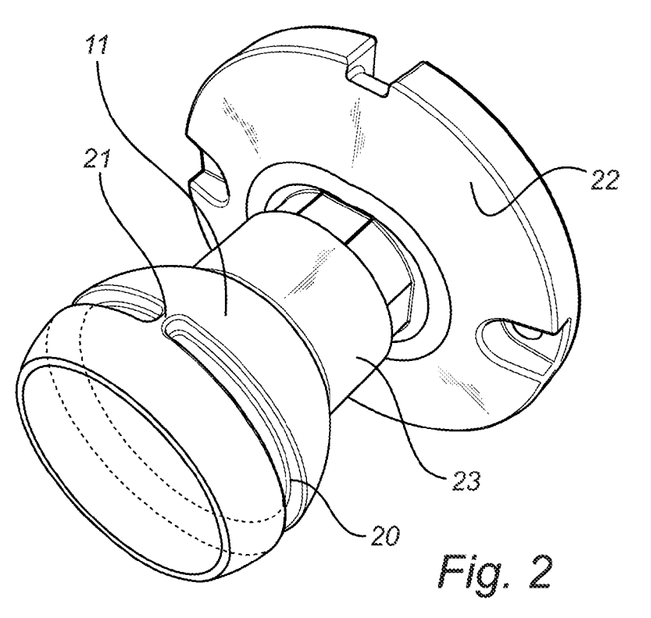
FIG. 2 illustrates the ball of the ball joint in the FIGS. 1a and 1b.

FIG. 2 is a more detailed illustration of the ball 11. An arm 23 and a plate member 22 are provided in connection to the ball 11. The plate member 22 may be attached to the housing 17 of the attachment part 12.

The ball 11 is provided with a groove 20. The groove 20 is formed to have ends. In other words, the groove 20 does not extend continuously around the ball 11. The groove 20 is provided with ends to form a rotation stop for the ball 11, meaning that the ball 11 should not be allowed to rotate endlessly. The purpose of the rotation stop may be explained with reference to FIG. 4, where the ball joint 10 is illustrated with a cable 41 arranged there through. The cable 41 may be provided between a camera device located in the housing 17 of the attachment part 12 and the base part 14. By limiting the rotational movement of the ball 11, rotation of the cable 41 is also limited thus lowering the risk of damaging or even breaking the cable 41 due to the twist.

Returning to FIG. 2, the groove 20 is provided to face outwards from the ball 11. The groove 20 is thus not provided on an interior surface of the ball 11.

In this embodiment, the groove 20 is arranged essentially around the ball 11 by that the groove 20 extends almost around the ball. Moreover, the groove 20 is arranged essentially equatorially such that a gap 21 is provided between the ends of the groove 20.

The ball 11 does not need to have the strict shape of a ball but may instead be cut off in one end as in FIG. 2. Other forms of the ball 11 that are known from ball joint designs are also feasible.

Figure 3:
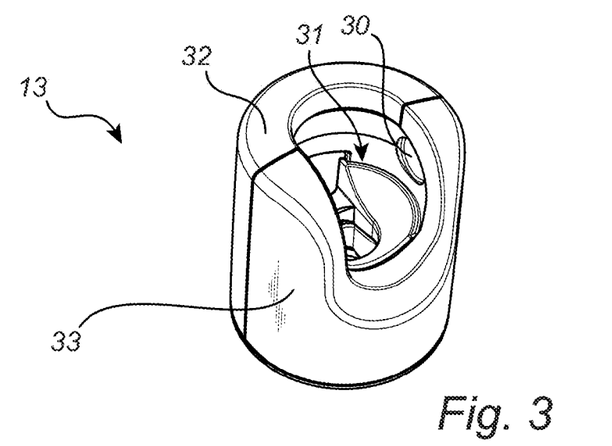
FIG. 3 illustrates the ball socket of the ball joint in the FIGS. 1a and 1b.

FIG. 3 is a more detailed illustration of the ball socket 13. The ball socket 13 comprises a cavity 31 for receiving the ball 11 in order to form the ball joint 10. The ball socket 13 is in this embodiment composed by a first component 32 and a second component 33 which are connected.

The ball socket 13 is provided with a recess 30. The recess 30 is located at an interior surface of the ball socket 13. Specifically, the recess 30 faces inwards and towards the cavity 31. The recess 30 is located such that the tilt axis of the ball 11, when the ball 11 is located in the ball socket 13, extends through the recess 30.

Figure 4:
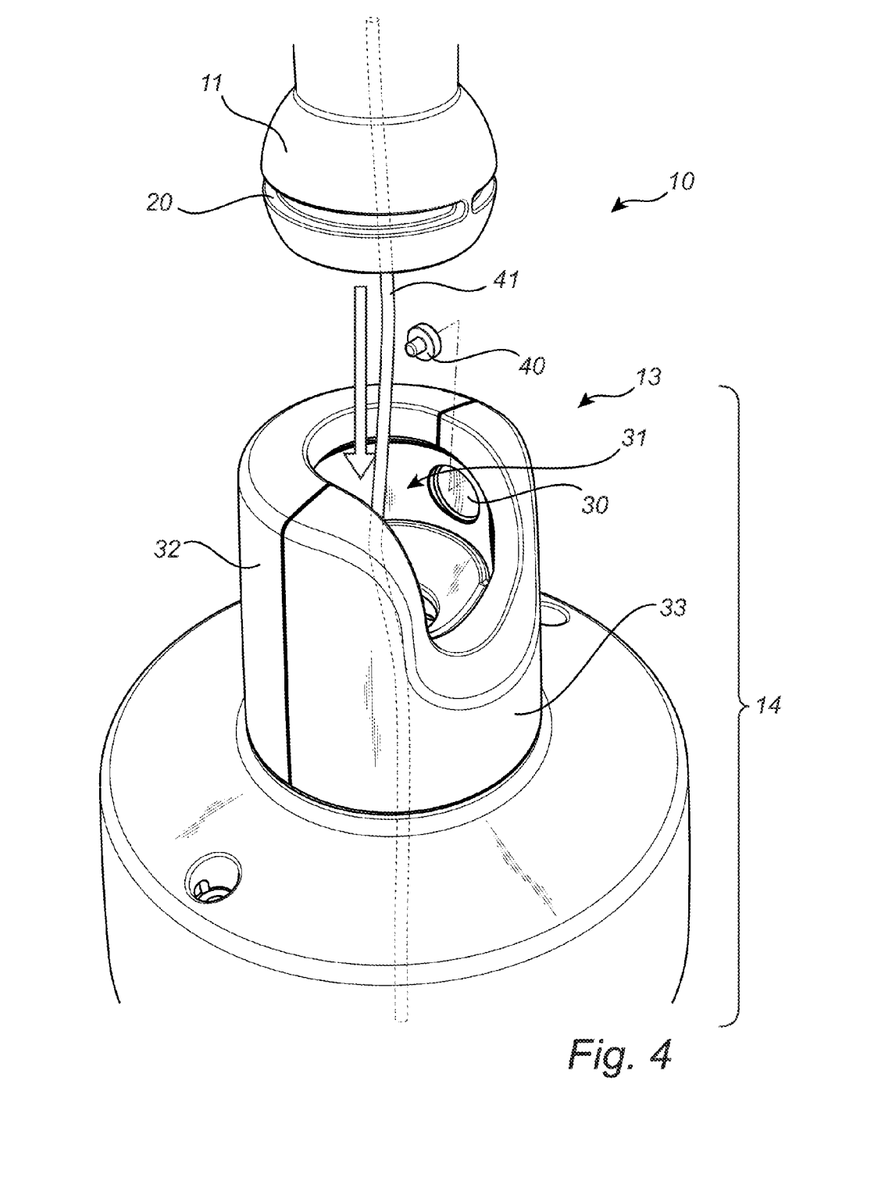
FIG. 4 illustrates how the parts of the ball joint in FIGS. 1a and 1b are arranged in relation to each other.

Constructional details of the ball joint 10 are illustrated in FIG. 4. The ball 11 is arranged in the ball socket 13, more specifically in the cavity 31 of the ball socket 13. A coupling element 40 is arranged between the ball 11 and the ball socket 13. One part of the coupling element 40 is located in the groove 20 and another part of the coupling element 40 is located in the recess 30. The coupling element 40 is formed as a pin element having a first part with a smaller cross-section and a second part with a larger cross-section. The first part is (optionally partly) located in the groove 20. The second part is (optionally partly) located in the recess 30.

The coupling element 40 is allowed to move in the groove 20 and in the recess 30. In other words, when the ball 11 is moved, the coupling element 40 may move within the groove 20 and within the recess 30. The recess 30 is arranged such that the coupling element 40 is allowed to move freely in the plane of the recess 30. Specifically, the recess 30 is arranged to be larger than the part of the coupling element 40 located therein. By move freely is meant that the coupling element 40 may be moved within the recess 30, i.e. along the plane of the recess 30, without guidance in a particular direction. On the contrary, the groove 20 is arranged so as to provide a guided movement for the part of the coupling element 40 located therein.

The combined arrangement of the recess 30 and the groove 20 with the coupling element 40 located therein allows the ball 11 to move from a first end position to a second end position by a rotational movement. The rotation stop referred to above is thereby provided since endless rotational movement of the ball 11 is prevented.

It is noted that the components of the ball joint 10 do not need to be assembled according to the arrows and indications of FIG. 4. Specifically for the embodiment illustrated in FIG. 4, the ball 11 is not directly insertable in the cavity 31 when the components 32, 33 of the ball socket 13 are connected. The ball joint 10 is instead assembled by arranging and connecting the first and second components 32, 33 around the ball 11 with the coupling element 40 arranged with its respective part in the groove 20 and in the recess 30.

Figure 5A:
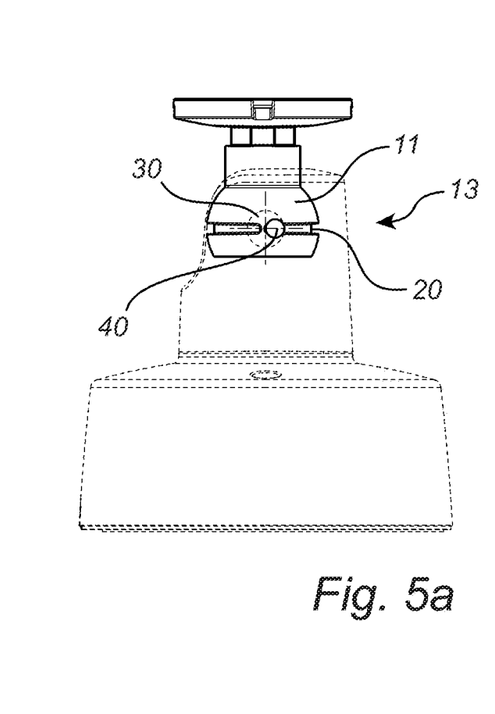
FIGS. 5a-5c illustrate the system in FIGS. 1a and 1b during simultaneous tilt and rotational movement.
Figure 5B:
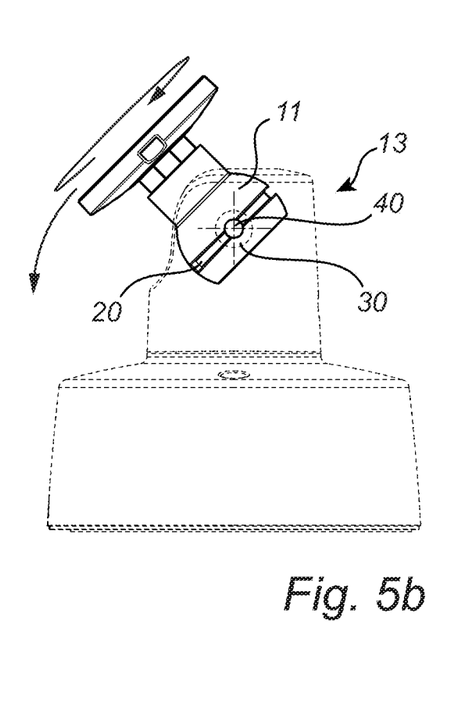
Figure 5C:
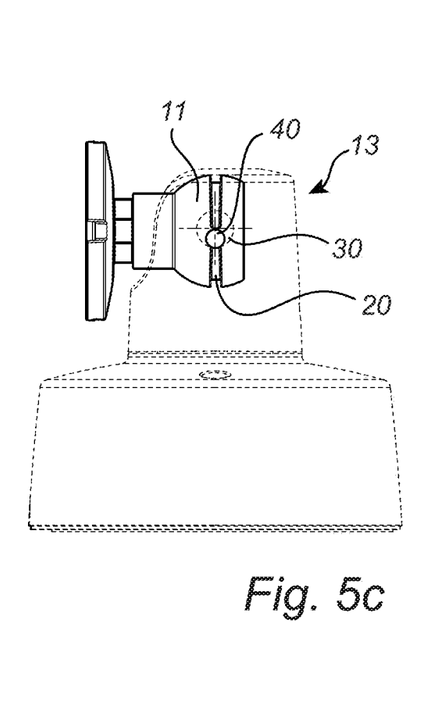

The ball joint 10 is constructed for providing a simultaneous rotational and tilt movement in at least a selected tilt range. In this embodiment, the tilt range is at least 0-90 degrees, where the position of the ball 11 in the ball socket 13 at 0 degrees is illustrated in FIG. 1a and at 90 degrees in FIG. 1b. FIGS. 5a-5c illustrate three positions for the ball 11 in the ball socket 13 when simultaneously rotated and tilted starting from a first end position at a tilt axis of 0 degrees (FIG. 5a) to a second end position at a tilt axis of 90 degrees (FIG. 5c). FIG. 5b illustrates an intermediate position at a tilt axis of about 45 degrees and a rotation of 180 degrees.

The configuration of the ball joint 10 allows a rotational movement of the ball 11, and thus the associated attachment part 12, of slightly more than 360 degrees, i.e. slightly more than one turn about the ball 11. A rotational range of at least 360 degrees is beneficial for allowing the attachment part 12, and thus the camera device in this embodiment, to be rotated to any position while still providing a rotation stop. The arrangement of the ball joint 10 also provides that the ball 11 is allowed to be rotated in any tilt angle, at least within a selected range (0-90 degrees in this embodiment). These combined functions are provided by that the recess 30 is arranged such that the coupling element 40 is allowed to move freely in the plane of the recess 30 as described above.

Figure 6:
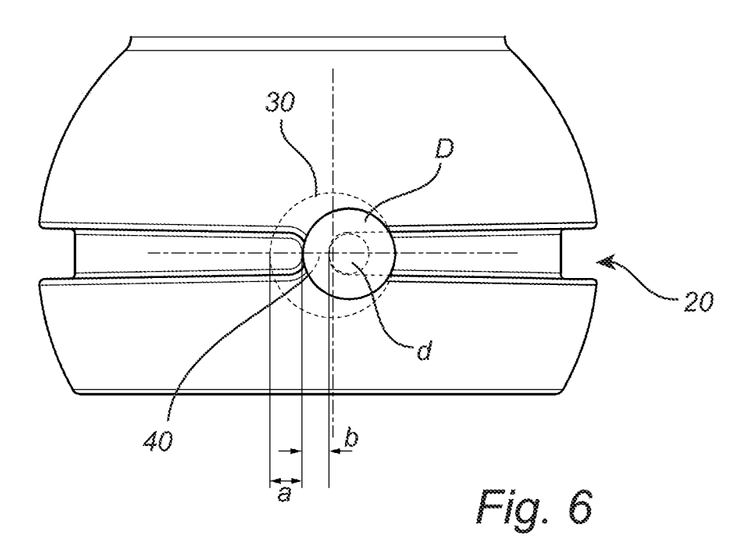
FIG. 6 is a close-up illustrating the relation between the ball, the coupling element, and the recess of the ball socket of the ball joint in FIGS. 1a and 1b.

The design of the groove 20, the recess 30 and the coupling element 40 will now be explained in detailed with reference to FIG. 6. The larger cross-section of the coupling element 40 is denoted D and the smaller cross-section of the coupling element 40 is denoted d. The coupling element 40 has reached one of the ends of the groove 20. If the rotational movement of the ball 11 was defined only by the groove 20, the ball 11 would not be able to move 360 degrees due to the gap between the groove ends. The distance provided between the groove ends by the gap is denoted by b. However, the arrangement of the recess 30 is larger than the cross-section D such that the coupling element 40 is allowed to move within the recess 30 a distance denoted by a. By that the distance a is equal to, as in this example, or larger than the distance b the ball 11 is allowed to rotate the remaining angle up to, or beyond, 360 degrees of rotation, i.e. a full turn or more.

By that the recess 30 is arranged so that the coupling element 40 is allowed to move freely in the plane of the recess 30, and thus not only along one direction, the rotational movement of the ball is allowed in multiple tilt angles depending on the form of the recess 30. In this embodiment, where the recess 30 is circular with a diameter being larger than the diameter of the circular cross-section D, rotational movement of the ball 11 is allowed in any tilt angle.

In order to enable a rotational movement of at least 360 degrees in any tilt angle of a selected tilt range, the shape of recess should be selected so as to allow movement of the coupling element 30 across the recess at least a minimum distance corresponding to the gap between the ends of the groove 20 in every tilt angle of the selected tilt range.

As can be understood from the above, the arrangements and designs of the coupling element 40, the groove 20, and the recess 30 depend on each other and are selected so as to achieve the desired functions of the movement of the ball 11 within the ball socket 13, i.e. allowing a simultaneous rotational and tilt movement of the ball 11 in a selected tilt range. Depending on the selected tilt range, the recess 30 may have different minimum requirements. For example, for a selected tilt range of 0-90 degrees, the recess 30 may be shaped as a three quarters circle. However, a full circle may still be preferred for other reasons such as alleviating the manufacturing process.

Figure 7:
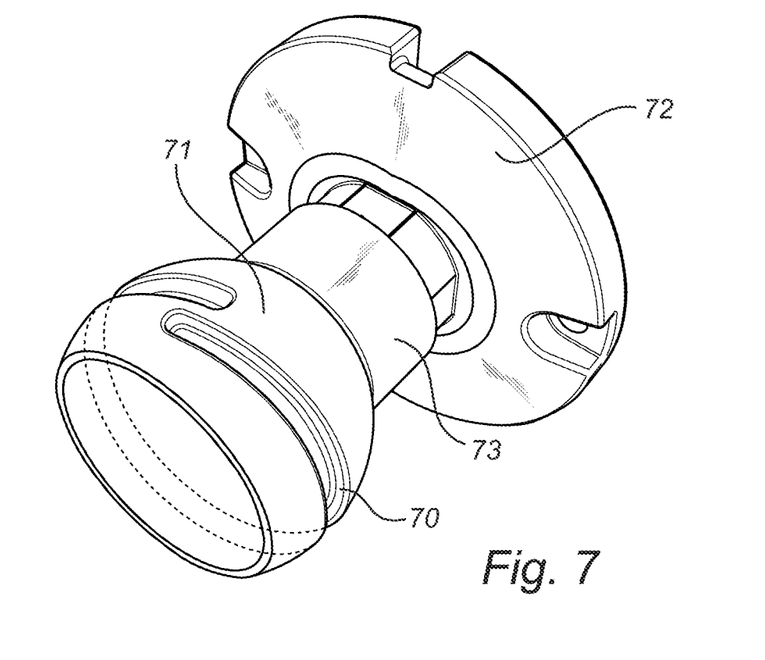
FIG. 7 illustrates a ball of a ball joint according to another embodiment.
Figure 8A:
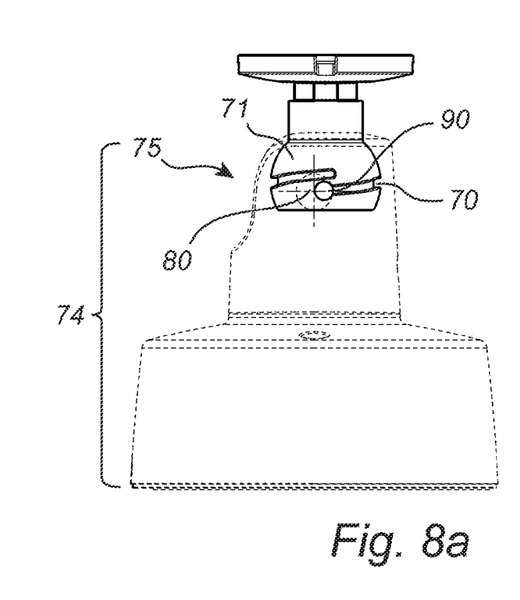
FIGS. 8a-8c illustrate a system comprising a ball joint with the ball of FIG. 7 during simultaneous tilt and rotational movement.
Figure 8B:
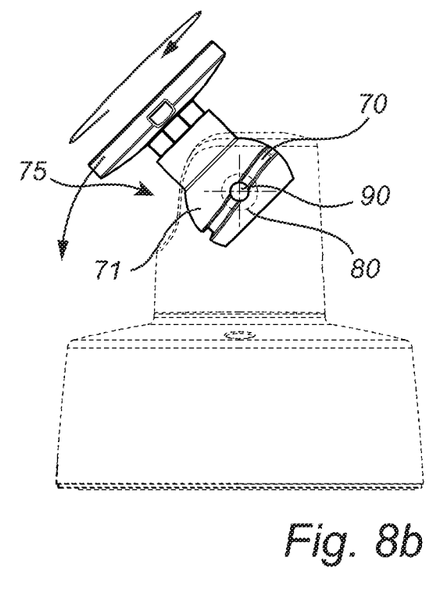
Figure 8C:
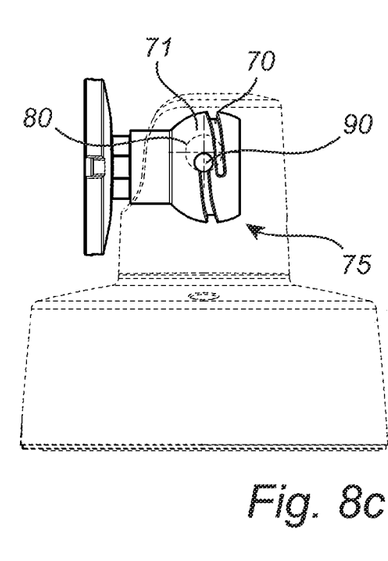

A second embodiment of a ball joint will now be disclosed with reference to FIGS. 7-8c.

The constructional details of the ball joint which are substantially different from the above first embodiment will be disclosed. Other constructional details may be similar to the corresponding ones of the first embodiment.

The ball joint comprises a ball 71 which is illustrated in FIG. 7. The ball 71 is provided with a groove 70. In similar to the ball joint of the first embodiment, an arm 73 and a plate member 72 are provided. The ball 71 forms part of an attachment part.

The groove 70 is arranged helically. The groove 70 is arranged essentially around the ball 71. The groove 70 extends slightly more than one turn around the ball 71. A rotational movement of the ball 71 of a bit more than one turn, i.e. a slightly more than 360 degrees, is thus provided.

The movement of the ball 71, and thus the associated attachment part, between a first end position and a second end position and in relation to a base part 74 is illustrated in FIGS. 8a-8c. FIGS. 8a-8c illustrate three positions for the ball 71 in a ball socket 75 when simultaneously rotated and tilted starting from a first end position at a tilt axis of 0 degrees (FIG. 8a) to a second end position at a tilt axis of 90 degrees (FIG. 8c). FIG. 8b illustrates an intermediate position at a tilt axis of about 45 degrees and a rotation of 180 degrees.

The ball socket 75 is provided with a recess 80 and a coupling element 90. As in the first embodiment, the recess 80 is larger than a part of the coupling element 90 located therein such that the coupling element 90 is allowed to move freely in the plane of the recess 80. In this second embodiment, this shape of the recess 80 provides the possibility to rotate the ball 71 in the ball socket 75, whereby the coupling element 90 is guided by the groove 70, without forcing the ball 71 to tilt sideways. By tilt sideways is meant tilting in a direction traverse to the main tilt direction that is indicated in FIG. 8b.

Hence, the ball joint according to the second embodiment provides, besides a rotational movement of more than 360 degrees, an increased freedom when adjusting the ball 71 relative the ball socket 75. The shape of the recess 80, being larger than the part of the coupling element 90 located therein, also enables rotational movement of the ball 71 in the ball socket 75 in a selected tilt range. As disclosed above, the beneficial circular design of the recess 80 provides a simultaneous rotational movement and tilt movement for any tilt angles.

The coupling elements 40, 90 may be made of steel. The other parts of the system, such as the ball 11, 71 and components of the ball socket 13, 75 may be made of aluminum.

It is noted that the ball joint as exemplified above may be constructed in a reverse manner wherein the attachment part (the first part) comprises the ball socket and the base part (the second part) comprises the ball.

The person skilled in the art realizes that the present disclosure by no means is limited to the preferred embodiments described above. On the contrary, many modifications and variations are possible within the scope of the appended claims. For example, the concept of providing a combined arrangement of a groove in a ball, a recess in an interior surface of a ball socket and a coupling element so as to enable simultaneous rotational and tilt movement of the ball relative the ball socket may be applied to ball joints of various otherwise conventional designs. The ball joint may be applied in various applications where it is desired to provide the above disclosed advantageous effects of the ball joint.

What is claimed is:

1. A ball joint comprising:
   a ball associated with an attachment part and provided with a groove having ends, wherein the groove extends essentially equatorially, essentially one turn around the ball;
   a ball socket formed in a base part and provided with a recess; and
   a coupling element;
   wherein the ball joint is arranged to couple the attachment part to the base part such that the attachment part is tiltable relative to the base part and such that the attachment part is rotatable relative to the base part;
   wherein the ball and the coupling element are arranged in the ball socket such that a first part of the coupling element is located in the groove and a second part of the coupling element is located in the recess whereby movement of the ball is restricted;
   wherein the recess and the groove are arranged such that the second part of the coupling element is allowed to move within the recess;
   wherein the combined arrangement of the groove, the recess, and the coupling element allows the ball to move from a first end position to a second end position by a rotational movement of at least 360 degrees; and
   wherein the recess is larger than the second part of the coupling element located therein such that the coupling element is allowed to move freely in the plane of the recess.

2. The ball joint according to claim 1, wherein the groove is arranged equatorially such that a gap is provided between the groove ends, and wherein the recess is arranged to allow the second part of the coupling element located therein to move a distance corresponding to the gap.

3. The ball joint according to claim 1, wherein the recess is arranged such that the tilt axis of the ball extends through the recess.

4. The ball joint according to claim 1, wherein the groove is arranged helically.

5. The ball joint according to claim 1, wherein the recess is circular.

6. The ball joint according to claim 1, wherein the attachment part is tiltable at least 90 degrees relative the base part.

7. The ball joint according to claim 1, wherein the coupling element is made of steel.

8. The ball joint according to claim 1, wherein the attachment part is part of a monitoring camera device, an illumination device, or a speaker device.

9. The ball joint according to claim 4, wherein the groove is arranged at least around the ball.

10. The ball joint according to claim 5, wherein the circular recess is arranged such that the tilt axis of the ball extends through the center of the recess.

11. A system comprising an attachment part and a base part which are coupled by a ball joint such that the attachment part is tiltable relative the base part and such that the attachment part is rotatable relative to the base part, wherein the ball joint is arranged according to claim 1.

12. The system according to claim 11, further including a monitoring camera device comprising the attachment part.

\* \* \* \* \*

UNITED STATES PATENT AND TRADEMARK OFFICE
CERTIFICATE OF CORRECTION

PATENT NO. : 10,082,726 B2  
APPLICATION NO. : 15/457551  
DATED : September 25, 2018  
INVENTOR(S) : Fagerkvist Page 1 of 1

It is certified that error appears in the above-identified patent and that said Letters Patent is hereby corrected as shown below:

On the Title Page

In item (30) Foreign Application Priority Data, amend the incorrect date by deleting "March 20, 2016" and inserting therefor --March 15, 2016-- for (EP) 16160342.

Signed and Sealed this  
Twelfth Day of March, 2019

Andrei Iancu  
*Director of the United States Patent and Trademark Office*